(12) United States Patent
Silva et al.

(10) Patent No.: US 10,387,007 B2
(45) Date of Patent: Aug. 20, 2019

(54) VIDEO TILING

(71) Applicant: Savant Systems, LLC, Hyannis, MA (US)

(72) Inventors: Michael C. Silva, East Sandwich, MA (US); Mark Tubinis, Andover, MA (US); Christopher Perry, Hyannis, MA (US); Nicholas J. Cipollo, Boston, MA (US); Duarte M. Avelar, Plymouth, MA (US); James F. Allen, Sandwich, MA (US); David W. Tatzel, West Yarmouth, MA (US); Andrew Hamm, Hyannis, MA (US)

(73) Assignee: Savant Systems, LLC, Hyannis, MA (US)

( * ) Notice: Subject to any disclaimer, the term of this patent is extended or adjusted under 35 U.S.C. 154(b) by 721 days.

(21) Appl. No.: 14/189,618

(22) Filed: Feb. 25, 2014

(65) Prior Publication Data

US 2014/0245148 A1 Aug. 28, 2014

Related U.S. Application Data

(60) Provisional application No. 61/768,917, filed on Feb. 25, 2013.

(51) Int. Cl.
*G06F 3/0484* (2013.01)
*G06F 3/0488* (2013.01)
(Continued)

(52) U.S. Cl.
CPC ........ *G06F 3/04842* (2013.01); *G06F 3/0488* (2013.01); *H04N 5/44591* (2013.01);
(Continued)

(58) Field of Classification Search
CPC .... G06F 3/048; G06F 3/04842; G06F 3/0488; H04N 5/44591
(Continued)

(56) References Cited

U.S. PATENT DOCUMENTS 7,907,142 B2   3/2011 Racicot
8,458,613 B2   6/2013 Oshiro et al.
(Continued)

FOREIGN PATENT DOCUMENTS

EP    2081384 A2    7/2009

OTHER PUBLICATIONS

"Advanced Quad Screen Video Processor: User Guide," Avenview, Inc., 2012, retrieved from the Internet on Dec. 18, 2012, pp. 1-35.
(Continued)

*Primary Examiner* — Angie Badawi
(74) *Attorney, Agent, or Firm* — Cesari and McKanna, LLP; James A. Blanchette

(57) ABSTRACT

In one embodiment, a tiled video display is shown on a screen of a display device. The tiled video display includes a plurality of video tiles that each show video content of a different video stream. The video tiles are arranged on the screen according to a tiling layout. A user interface (UI) is shown on a touch sensitive screen of a wireless mobile device separate from the display device. The UI includes a plurality of UI tiles that each correspond to a respective video tile of the tiled video display. The UI tiles are arranged on the virtual display screen according to the tiling layout of the video tiles. In response to a gesture over at least a portion of a particular one of the UI tiles on the touch sensitive screen, a modification is made to both the particular UI tile and a correspond video tile.

25 Claims, 14 Drawing Sheets

(51) Int. Cl.
*H04N 5/445* (2011.01)
*H04N 7/18* (2006.01)
*H04N 21/422* (2011.01)
*H04N 21/41* (2011.01)
*H04N 21/431* (2011.01)
*H04N 21/443* (2011.01)
*H04N 21/4402* (2011.01)

(52) U.S. Cl.
CPC ......... *H04N 7/181* (2013.01); *H04N 21/4126* (2013.01); *H04N 21/4222* (2013.01); *H04N 21/42207* (2013.01); *H04N 21/42209* (2013.01); *H04N 21/42224* (2013.01); *H04N 21/4316* (2013.01); *H04N 21/4438* (2013.01); *H04N 21/440263* (2013.01)

(58) Field of Classification Search
USPC ......................................................... 715/719
See application file for complete search history.

(56) References Cited

U.S. PATENT DOCUMENTS

| | | | | |
|---|---|---|---|---|
| 2010/0017748 A1* | 1/2010 | Taylor | ................... | G06F 3/0481 715/788 |
| 2010/0077431 A1* | 3/2010 | Neufeld | ................ | G06F 3/0488 725/39 |
| 2010/0110082 A1* | 5/2010 | Myrick | ................... | G06T 13/80 345/473 |
| 2010/0299421 A1* | 11/2010 | Gurdan | ................ | G10H 1/0066 709/222 |
| 2010/0306499 A1* | 12/2010 | Petolino, Jr. | ........ | G06F 12/1027 711/207 |
| 2012/0081299 A1* | 4/2012 | Xiao | ................ | H04N 21/42224 345/173 |
| 2013/0283318 A1* | 10/2013 | Wannamaker | ......... | H04H 20/30 725/56 |
| 2014/0164990 A1* | 6/2014 | Kim | .................... | G06F 3/04817 715/790 |

OTHER PUBLICATIONS

"Crestron DVPHD: High Definition Digital Video Processor Operations Guide," Crestron Electronics, Inc., 2012, retrieved from the Internet on Dec. 18, 2012, pp. 1-90.

"DVPHD: High Definition Digital Video Processor," Crestron Electronics, Inc., 2009, retrieved from the Internet on Dec. 18, 2012, pp. 1-9.

"MGP Series: Two & Four Window Multi-Graphic Processors," Extron Electronics, 2009, retrieved from the Internet on Dec. 18, 2012, 1-8.

"Four Computer and Video Sources on a Screen," RGB Spectrum, retrieved from the Internet on Dec. 18, 2012, pp. 1-4.

"TV ONE: C2-6104A Video Processor Operation Manual," TV One USA, retrieved from the Internet on Dec. 18, 2012, pp. 1-82.

"Vista Spyder X20," Vista Systems, Corp, 2011, retrieved from the Internet on Dec. 18, 2012, pp. 1-4.

"Notification of Transmittal of the International Search Report and the Written Opinion of the International Searching Authority, or the Declaration," International Filing Date: Feb. 25, 2014, International Application No. PCT/US2014/018194, Applicant: Savant Systems, LLC, dated Jun. 17, 2014, pp. 1-10.

* cited by examiner

"FULLSCREEN"
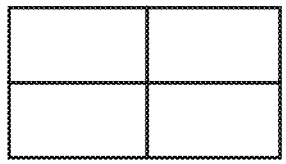
"2x2"
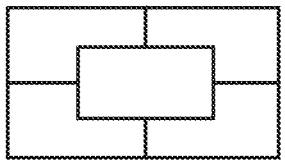
"2X2 + 1 SMALL"
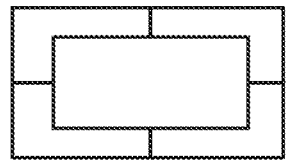
"2x2 + 1 BIG"
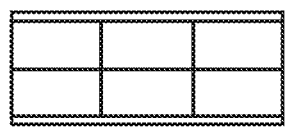
"2x3"
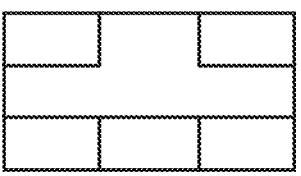
"5 + 1 BIG"
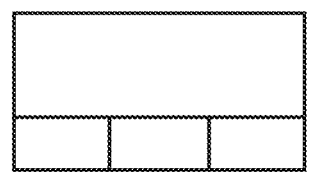
"5 + 1 SMALL"
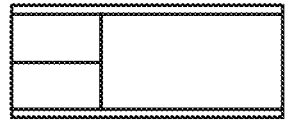
"2 LEFT 1 RIGHT"
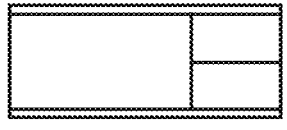
"1 LEFT 2 RIGHT"
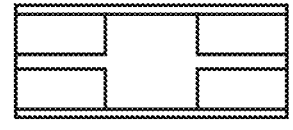
"4 + 1 BIG"
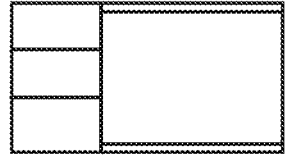
"3 LEFT 1 RIGHT"
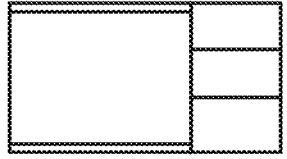
"1 LEFT 3 RIGHT"
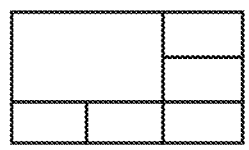
"6 / LARGE UPPER LEFT"
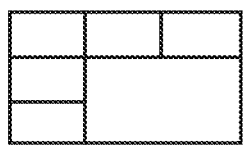
"6 / LARGE BOTTOM RIGHT"
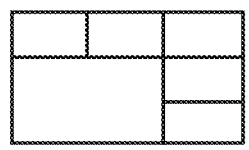
"6 / LARGE BOTTOM LEFT"
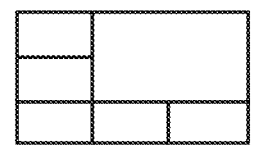
"6 / LARGE UPPER RIGHT"
FIG. 4B

VIDEO TILING

RELATED APPLICATIONS

The present application claims the benefit of U.S. Provisional Patent Application No. 61/768,917 entitled "Video Tiling", filed on Feb. 25, 2013 by Michael C. Silva et al., the contents of which are incorporated by reference in their entirety.

BACKGROUND

Technical Field

The present disclosure relates generally to audio/video systems and more specifically to creating a tiled video display, and controlling the tiled video display.

Background Information

As time progresses, users in both home and commercial settings have access to increasing amounts of video content provided as video streams from a variety of video source devices. Through cable television boxes and satellite television receivers, users may access a huge variety of televisions channels. Through digital media receivers, users is may access an ever expanding number of individual programs and movies that are streamed over the Internet. Through Blueray™ and other disc players, users may access a massive collection of recorded video content. Still further video content may be obtained from surveillance cameras, video conferencing systems, computer systems, gaming systems, and the like. Given all this video content, it is not surprising that users often desire to browse multiple video streams from multiple video source devices simultaneously.

To address this issue, a variety of video processing systems have been developed that take video streams from different video source devices, and simultaneously display the video streams in windows shown on a screen of a display device. For example, a processing system may take 8 different video streams, and simultaneously display their video content in 8 video windows arranged in a matrix on the screen of the display device.

While existing video processing systems that use video windows may aid the user in browsing video content, they generally suffer a number of shortcomings.

First, they are generally difficult to control. Some video processing systems rely upon physical selection buttons, disposed on either a front panel of the video processing system itself, or a button-centric remote control. To select a video window, and to them perform operations on the window, for example, to resize the video window to obtain a larger view of the video content shown therein, the user may have to actuate specific physical buttons in a particular order. It may be difficult for a user to remember which buttons correspond to which video windows and which operations. Incorrect button presses may lead to undesired results and frustration. Other video processing systems rely upon a graphical user interface displayed on the screen of the display device to control the windows. The graphical user interface may be navigated via a button-centric remote control or a pointing device (e.g., a mouse). While such a graphical user interface may offer some advantages over physical buttons, it may still be difficult to operate. Often, navigating the graphical user interface is cumbersome. The user may need to repeatedly scroll through various selected video windows to select a desired one, or move an often-difficult to see cursor to a particular location to select a particular video window. Such operations may time consuming and frustrating.

Second, the number of different video steams many existing video processing systems can display simultaneously is inadequate for some applications. Existing video processing systems are typically limited to simultaneously displaying some modest fixed maximum number of different video streams, for example, 4, 6, 8, etc. different video streams. Yet a user may have access to a far greater number of different video streams. A user may desire to view and rapidly change focus between dozens or even hundreds of videos, for example, to navigate through a video library, categorize video content, or other purposes that involve "long tail" video content. However, this may be difficult given the limitations of existing video processing systems.

Accordingly, there is a need for improved systems that may address some, or all, of these shortcomings.

SUMMARY

In one or more embodiments of the present disclosure, a video tiling system permits a user to browse video content of multiple video streams from multiple video source devices simultaneously on a display device, using gestures on a touch-sensitive display screen of a separate wireless mobile device to control operations. Further, the video tiling system permits the display of an effectively unlimited number of video streams through a recursive tiling technique.

The video tiling system may include a matrix switcher/controller and a host controller. The matrix switcher/controller may have a modular design, and include a plurality of multi-window video processing output modules. The multi-window video processing output modules may be coupled to each other in a daisy chain arrangement, and operate to build a tiled video output stream through cascading operation. The tiled video output stream may be output to a display device (e.g., a television), such that a plurality of video tiles, each showing video content of a different video stream, are simultaneously displayed.

The matrix switcher/controller may operate under the direction of the host controller, which controls and monitors it operation, and communicates with a separate wireless mobile device having a touch-sensitive screen, for example, via a wireless network connection. The wireless mobile device may display a user interface (UI) that shows a plurality of UI tiles arranged on a virtual display screen. The virtual display screen is a graphical representation of the screen space of a corresponding screen of the display device. UI tiles are each a graphical representation of a corresponding video tile, and are arranged in a tiling layout that corresponds to the arrangement of the video tiles on a screen of the display device. Using gestures (e.g., multi-touch gestures) on the touch sensitive screen of the wireless mobile device, a user may resize and/or rearrange the UI tiles on the virtual display screen. For example, a user may use gestures to expand a particular UI tile, so that it encompasses a greater portion, or the entire, virtual display screen, or contract a particular UI tile so that it encompasses a smaller portion of the virtual display screen. Similarly, a user may use gestures to swap a particular UI tile with a different UI tile, so that their respective positions are exchanged. In response, the host controller may cause the matrix switcher/controller, and it multi-window video processing output modules, to change the tiled video output stream, such that the video tiles shown on the screen of the display device are resized and/or rearranged in a corresponding manner.

Further, by using gestures to select a particular UI tile on the touch sensitive screen of the wireless mobile device, the user may configure and change properties of the corresponding video tile. Similarly, using gestures, the user may change a particular one of the video tiles for which related audio is played on an audio output device. The audio may be maintained through resizing and/or rearrangement the video tiles. Still further, the user may save a current tile arrangement and configuration as a custom tiling layout.

The video tiling system may provide for the display of an effectively unlimited number of video streams through a recursive tiling technique. Rather than show a single video stream from a particular video source device, one or more of the video tiles may be configured to show a tiled video output stream, such that multiple nested video tiles are shown within the confines of the video tile. To provide such a display, a first tiled video output stream may be produced, and then feed back, and used along with additional video streams, to construct a second tiled video output stream, the video tiles of the first tiled video output stream being shown as nested video tiles within a tile of the second video output stream. The resulting second tiled video output stream may be shown on the display device, or fed back again, to produce another level of nesting.

The user may use the UI shown on the touch sensitive screen of the wireless mobile device to navigate through the layers of nesting. Nested UI tiles may correspond to each nested video tile. Using gestures (e.g., multi-touch gestures) on the touch sensitive screen of the wireless mobile device, a user may expand and contract nested UI tiles, to navigate between lower and higher levels of nesting, in order to browse the video content.

It should be understood that a variety of other embodiments and implementations may utilize ones of the techniques and structures described in this Summary. This Summary is intended simply as a brief introduction to the reader, and does not imply that the specific features mentioned herein are all the features of the invention, or are essential features of the invention.

BRIEF DESCRIPTION OF THE DRAWINGS

The invention description below refers to the accompanying drawings, of which:

FIG. 4B is a series of diagrams of example preset tiling layouts that may be supported by the video tiling system;

DETAILED DESCRIPTION

Figure 1:
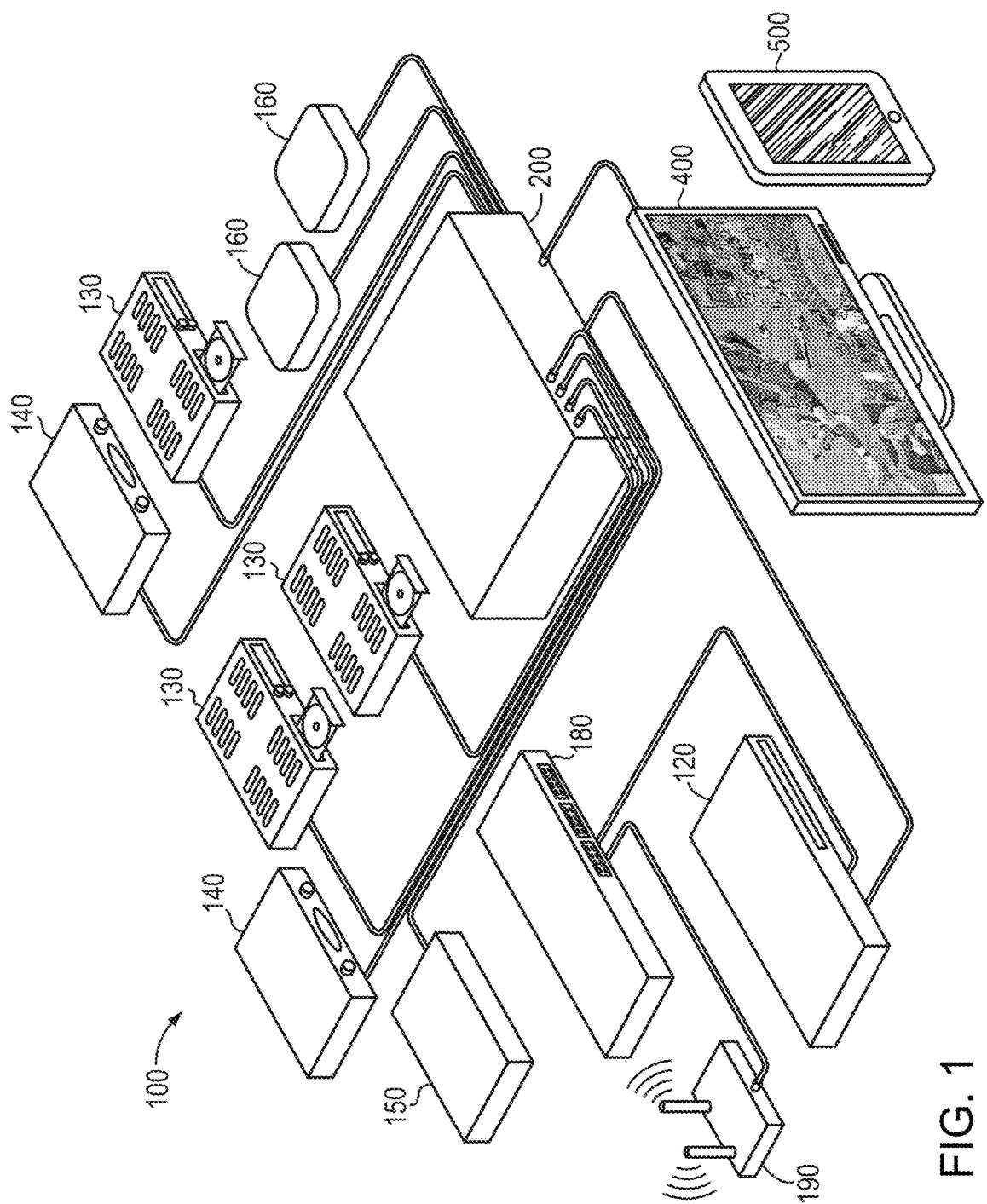
FIG. 1 is a block diagram of an example architecture for a video tiling system.

FIG. 1 is a block diagram of an example architecture 100 for a video tiling system. The example architecture includes a matrix switcher/controller 200 and a host controller 120. The matrix switcher/controller 200 is configured to switch signals between, control, and otherwise interoperate with a variety of devices, for example, providing N×N switching, multi-zone audio and video processing, device control, and other capabilities. The host controller 120 is configured to control and monitor operations of the matrix/switcher controller 200, as well as to provide user interface interpretation and high-level control functions.

The matrix switcher/controller 200 may be coupled to a variety of video source devices, such as disc players 120, cable television boxes 140, satellite television receivers 150, digital media receivers 160, surveillance cameras, video conferencing systems, computer systems, gaming systems, and the like. At least some of the video source devices may also operate as audio sources, providing audio streams that, for example, accompany video streams provided by the devices. The matrix switcher/controller 200 may also be coupled to dedicated audio source devices (not shown), such as compact disc (CD) players, digital music players, radio receivers, etc. Likewise, the matrix switcher/controller 200 may be coupled to a variety of display devices, for example, display device 400. The display devices may be televisions, monitors, projectors or other devices that can display video content. Display devices, including display device 400, may also operate as audio output devices, and include speakers for playing audio streams that, for example, accompany video content. The matrix switcher/controller 200 may also be coupled to dedicated audio output devices (not shown). Further, the matrix switcher/controller 200 may be coupled to a variety of other types of devices, including lighting devices, heating ventilation and air conditioning (HVAC) devices, telephony devices, etc., either directly, or through one or more intermediate controllers.

The host controller 120 is coupled to the matrix switcher/controller 200 and may also be coupled to a data switch 180. A wireless access point 190 may be coupled to the data switch 180, or integrated into the data switch 180. Alternatively, the host controller 120 may include its own wireless network interface.

The host controller 120 may wirelessly communicate with a variety of different types of user interface devices, such as remote controls, in-wall keypads, dedicated touch panels, and the like. In particular, the host controller 120 may communicate with one or more wireless mobile devices 500 having touch-sensitive screens. As used herein, the term "wireless mobile device" refers to an electronic device that is adapted to be transported on one's person, and includes wireless data communication capabilities. Devices such as tablet computers (e.g., the iPad® tablet available from Apple, Inc.), smartphones (e.g., the iPhone® multimedia phone available from Apple, Inc.), and portable media players (e.g., such as the iPod® touch available from Apple, Inc.), are considered wireless mobile devices.

Figure 2:
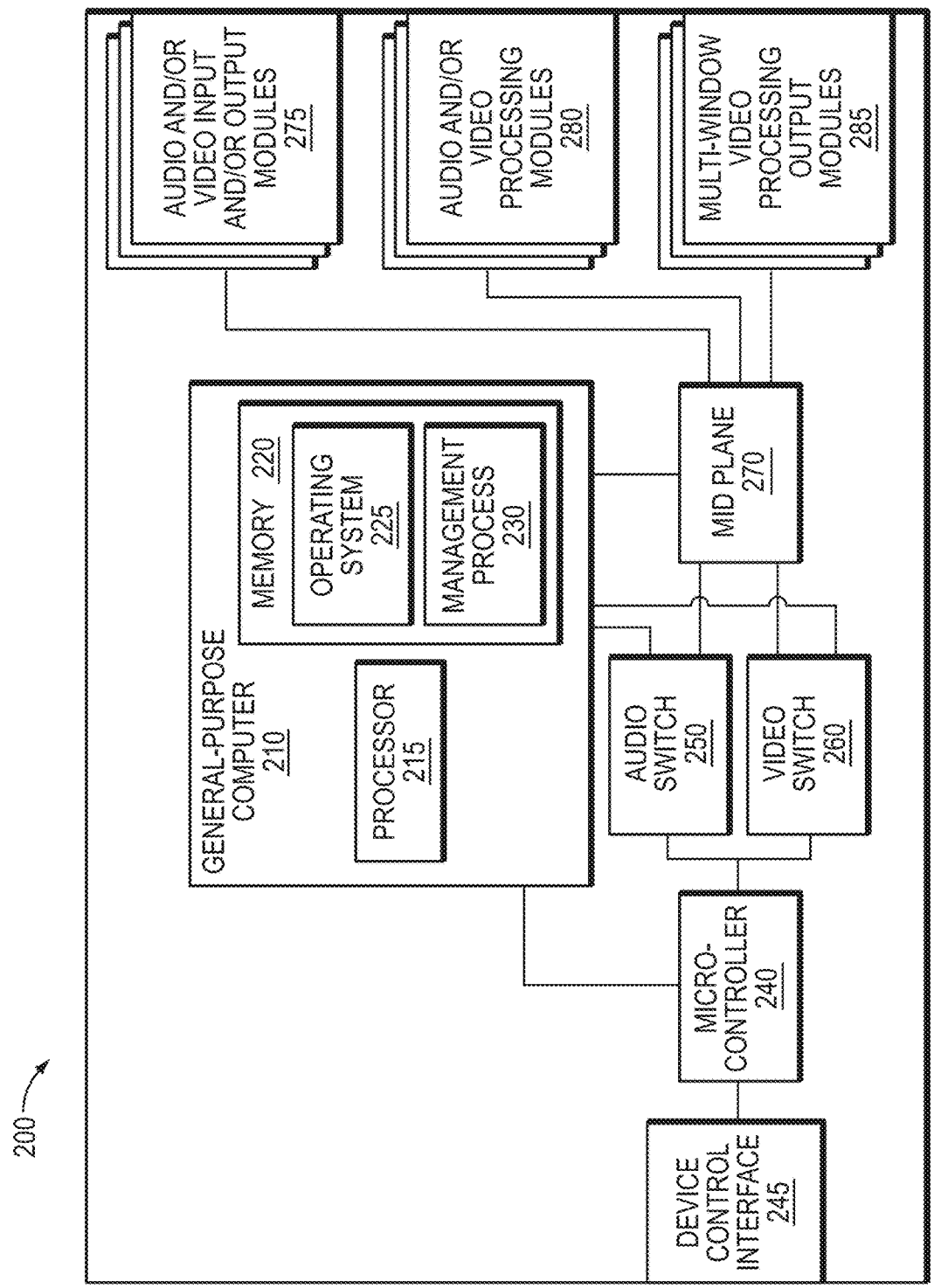
FIG. 2 is a block diagram of an example matrix switcher/controller.

FIG. 2 is a block diagram of an example matrix switcher/controller 200. The programmable multimedia controller 200 may include a general-purpose computer 210 having a processor 215 and a memory 220. The memory 220 comprises a plurality of storage locations for storing software and data structures. The processor 215 includes logic configured to execute the software and manipulate data from the data structures. A general-purpose operating system 225, portions of which are resident in memory 220 and executed by the processor 215, may functionally organize the general-purpose computer 210. The general-purpose operating system may be an OS X® Unix-based operating system, available from Apple, Inc., or another type of operating system. A management process 230, executed by the processor 215, may operate to, among other things, manage the construction of the tiled video output stream, in conjunction with software executing on the host controller 120, and on a wireless mobile device 500. A microcontroller 240 may be interconnected to the general purpose computer 210, and configured to implement low-level management of switching and device control operations for the matrix switcher/controller 200. A device control interface 245 may operate under the direction of the microcontroller 240, to communicate with, and provide control commands to, devices coupled to the matrix switcher/controller 200. Further, an audio switch 250 and a video switch 260 may be controlled by the microcontroller 240. The audio switch 250 and the video switch 260 may be N×N crosspoint switches. While shown as separate switches, the functionality of the audio switch 250 and the video switch 260 may be integrated into a single component in some implementations The matrix switcher/controller 200 may have a modular design, and a plurality of input/output slots may accommodate removable service modules. A mid plane 270 may interconnect the general purpose computer 210, the audio switch 250, the video switch 260 and other components of the matrix switcher/controller 200 to the input/output slots. Service modules may be disposed in the input/output slots. These modules may include, audio input modules, audio output modules, video input modules, video output modules, and combined modules (collectively audio and/or video input and/or output modules 275), audio processing modules, video processing modules, and combined processing modules (collectively audio and/or video processing modules 285), as well as other types of modules (not shown) that perform different types of functions.

To implement a video tiling system that allows a user to view video content of multiple video streams from multiple video source devices simultaneously, one or more multi-window video processing output modules 285 may be populated in the input/output slots of the matrix switcher/controller 200. In one implementation, each multi-window video processing output module 285 includes two scalars, two frame buffers, two mixers, and other components for supporting two video tiles of a tiled video display. In other implementations, differing numbers of components may be included for supporting differing numbers of video tiles. For example, in another implementation an individual multi-window video output module 285 may support four video tiles of a tiled video display, or eight video tiles of a tiled video display.

Figure 3:
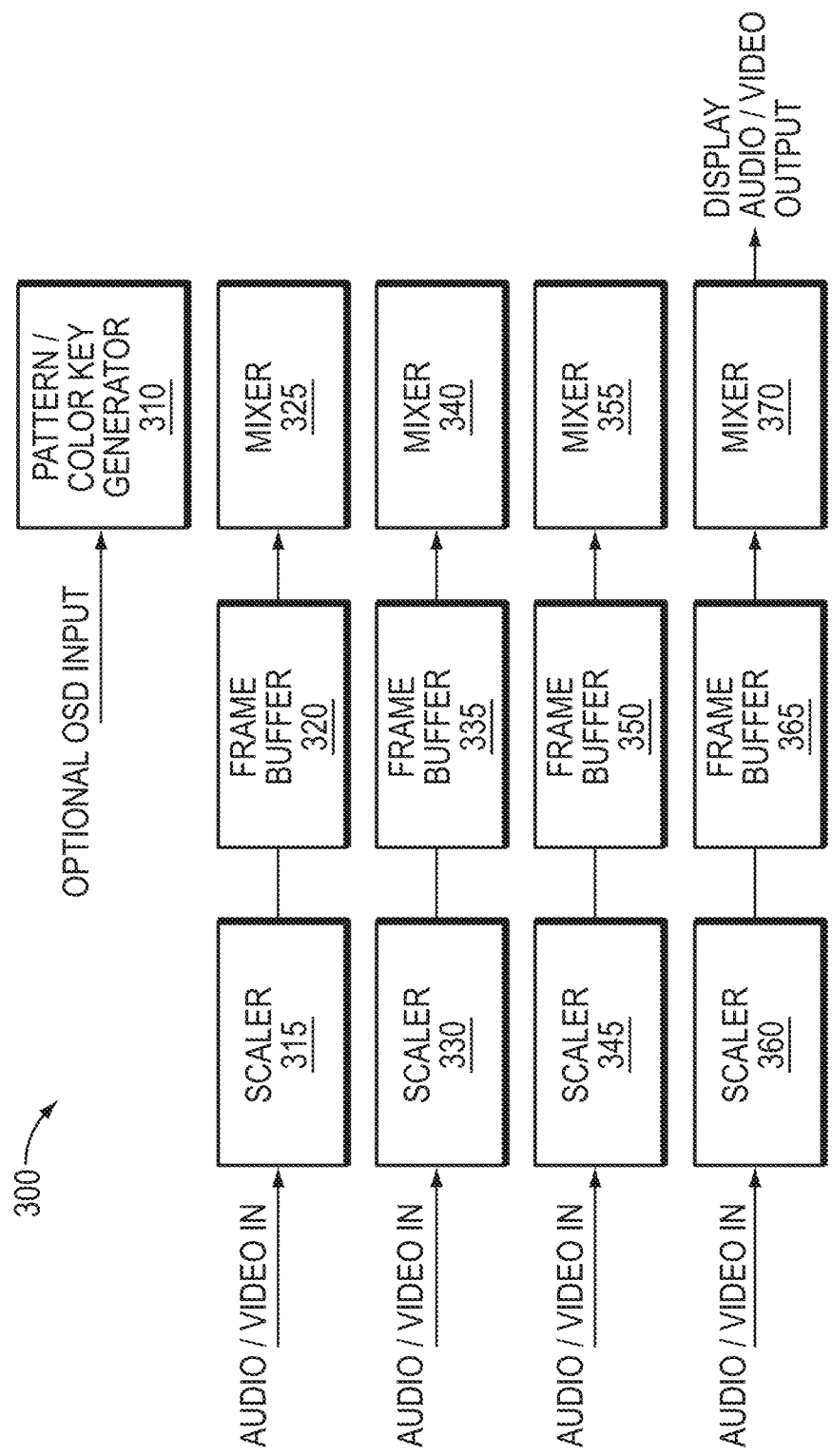
FIG. 3 a block diagram of components of two example multi-window video processing output modules coupled in a daisy chain arrangement.

The multi-window video processing output modules 285, and their internal components, may be coupled to each other in a daisy chain arrangement, and operate to build a tiled video output stream through cascading operation. FIG. 3 is a block diagram of components 300 of two example multi-window video processing output modules coupled in a daisy chain arrangement. The host controller 120 may supply video, for example, graphics that represent an on screen display (OSD) to be shown in conjunction with the video tiles. The video may be provided to a pattern/color key generator 310 that changes the color of certain pixels within each frame of the video to a particular color or a particular pattern of colors, to produce a "key" that is later used as a condition by mixers. Certain details regarding the creation and use of such a key may be found in U.S. patent application Ser. No. 11/687,511, filed Mar. 16, 2007 by Robert P. Madonna et al., the contents of which are incorporated by reference herein in their entirety. The pattern/color key generator 310 may also, in some implementations, provide certain video timing data.

The first multi-window video processing output module may take a first video stream from a video source device 130, 140, 150, or 160 that has been received by the matrix switcher/controller 200 and switched through video switch 260. The first video stream may be subject to a first scalar 315, and a video tile created therefrom stored in a first frame buffer 320. The locally stored video tile may be passed from the first frame buffer 320 to a first mixer 325, per the video timing data received, for example, from the pattern/color key generator 310. The first mixer 325 may include, among other things, pattern/color keying logic and blending logic. The pattern/color keying logic of the first mixer 325 looks for the key, for example, the pixels of the particular color or having the particular pattern of colors, within frames of incoming video from the pattern/color key generator 310, and determines whether pixels from the incoming video or those of the local video tile should be passed, for example, passing the local video tile where the key is present. In one implementation, the pattern/color keying logic of the first mixer 325 may look for the key within a programmable mixing region, e.g., a rectangular region having a size and offset within the frame. When the tile is to be resized, the local video tile may be passed within the mixing region regardless of the presence of a key, as the scalar 315 scales the video tile to the new size and the programmable mixing region expands or contracts accordingly. The blending logic of the first mixer 325 combines the pixels of the incoming video with those of the local video tile, as directed by the pattern/color keying logic of the first mixer 325 according to the key, or simply the programmable mixing region, as the case may be. The first multi-window video processing output module may then output a video stream, including the first video tile and graphics, on a first output port of the first multi-window video processing output module.

The first output port may be coupled (e.g., daisy chained) to a second input port of the first multi-window video processing output module, so that the video stream is fed back to the first multi-window video processing output module. The first multi-window video processing output module may take a second video stream from a video source device 130, 140, 150, or 160. The second video stream may be subject to a second scalar 330, and a video tile created therefrom stored in a second frame buffer 335. The locally stored video tile may be passed from the second frame buffer 335 to a second mixer 340, per the video timing data received, for example, from the pattern/color key generator 310. Pattern/color keying logic of the second mixer 340 looks for the key, within frames of incoming video coming in on the second input port, and determines whether pixels from the incoming video or those of the local video tile should be passed. Alternatively, if the tile is being resized, the local video tile may be passed within a mixing region regardless of the presence of a key. The blending logic of the second mixer 340 combines the pixels of the incoming video with those of the local video tile, as directed by the pattern/color keying logic of the second mixer 340 according to the key, or simply the programmable mixing region, as the case may be. In this manner, the second video tile may be combined with the video stream including the first video tile and the graphics, to produce a video stream having two video tiles. This video stream is output on a second output port of the first multi-window video processing output module. The second output port may be coupled (daisy chained) to an input port of a second multi-window video processing output module, and the technique repeated to add a third video tile, using a third scalar 345, a third frame buffer 350, and a third mixer 355, and again repeated to add a fourth video tile using a fourth scalar 360, a fourth frame buffer 365, and a fourth mixer 370, and again repeated . . . etc., to build a tiled video output stream having a desired number of video tiles. Eventually, an output port may be coupled to a display device 400, and the tiled video output stream provided to the display device 400 for display to a user. Accompanying audio may also be provided via the output port.

Figure 4A:
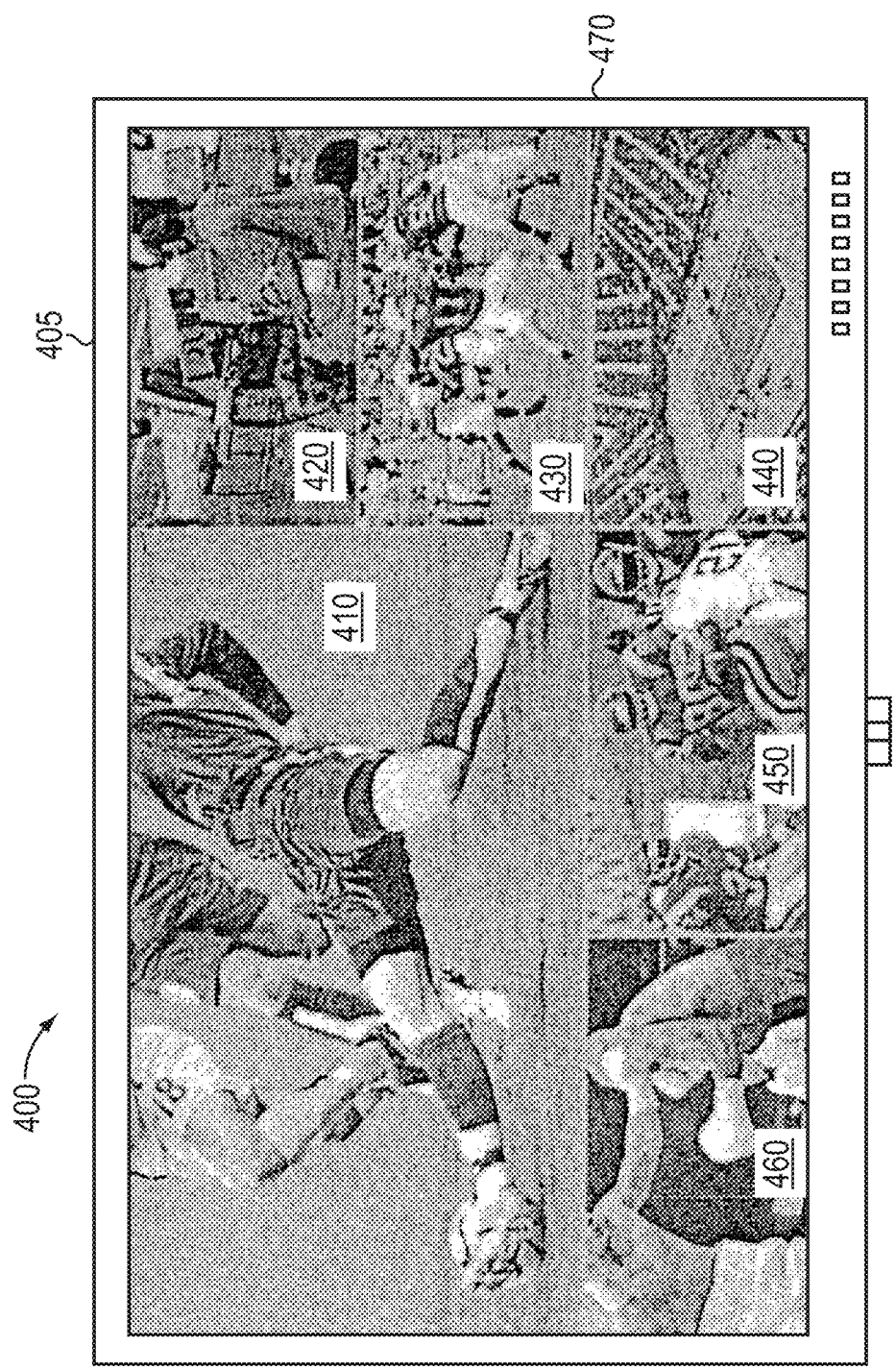
FIG. 4A is an exterior view of an example display device, showing a tiled video display, produced from a tiled video output stream.

FIG. 4A is an exterior view of an example display device 400, showing a tiled video display, produced from a tiled video output stream. In this example, the tiled video display includes six video tiles 410-460 on a screen 405, each showing video content of a different video stream, arranged according to what may be referred to as a "6/Large Upper Left" tiling layout. However, it should be understood that a different number of video tiles may be shown, arranged according to a variety of different tiling layouts. The video streams whose content is shown in the video tiles 410-460 may be scaled by the multi-window video processing output modules 285, while aspect ratios are maintained. Also, a frame or border 470 having programmable properties (e.g., presence, color, witch, etc.) may be rendered, and shown around each of the tiles, and the entire collection of tiles, to provide visual definition of their boundaries.

FIG. 4B is series of diagrams of example preset tiling layouts 480 that may be supported by the video tiling system. The previously mentioned"6/Large Upper Left" tiling layout may be an example of one of these supported tiling layouts. These preset tiling layouts, as well as custom tiling layouts, may be stored as one or more editable files, for example, extensible markup language (XML) files. It should be understood that a variety of other preset tiling layouts, and user-defined tiling layouts, may be supported. The user-defined tiling layouts may be defined in XML by the user to meet particular applications and user-specific needs.

Figure 5:
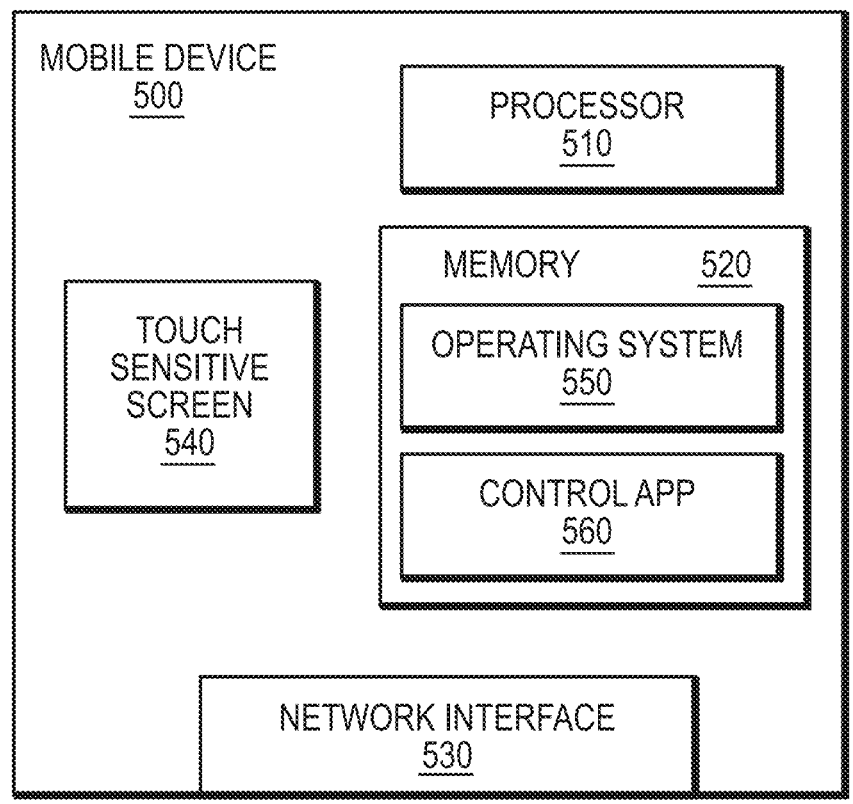
FIG. 5 is a block diagram of an example wireless mobile device.

The tiled video display may be controlled from a user interface shown on a touch-sensitive screen a wireless mobile device 500. FIG. 5 is a block diagram of an example wireless mobile device 500. The mobile device 500 may include a processor 510, a memory 520, a wireless network interface 530, and a touch-sensitive screen 540, among other components. The processor 510 includes logic configured to execute software and manipulate data from data structures. The memory 520 comprises a plurality of storage locations for storing the software and the data structures. The wireless network interface 530 may communicate with other devices, for example, the host controller 120. The touch-sensitive screen 540 may receive gestures (e.g., multi-touch gestures) from a user.

A general purpose operating system 550, portions of which are resident in memory 520, may functionally organize the wireless mobile device 500. The general-purpose operating system 550 may be an IOS® operating system available from Apple, Inc., or another type of operating system. A control application (app) 560 may be executed in conjunction with the operating system 550. The control app 560 may display a user interface (UI) on the touch sensitive screen 540, upon which gestures may be received to control the video tiling system. In response to input received in the UI, the control app 560 may communicate with the host controller 120, which may in turn pass along information to the management process 230 executing on the matrix switcher/controller 200.

Figure 6:
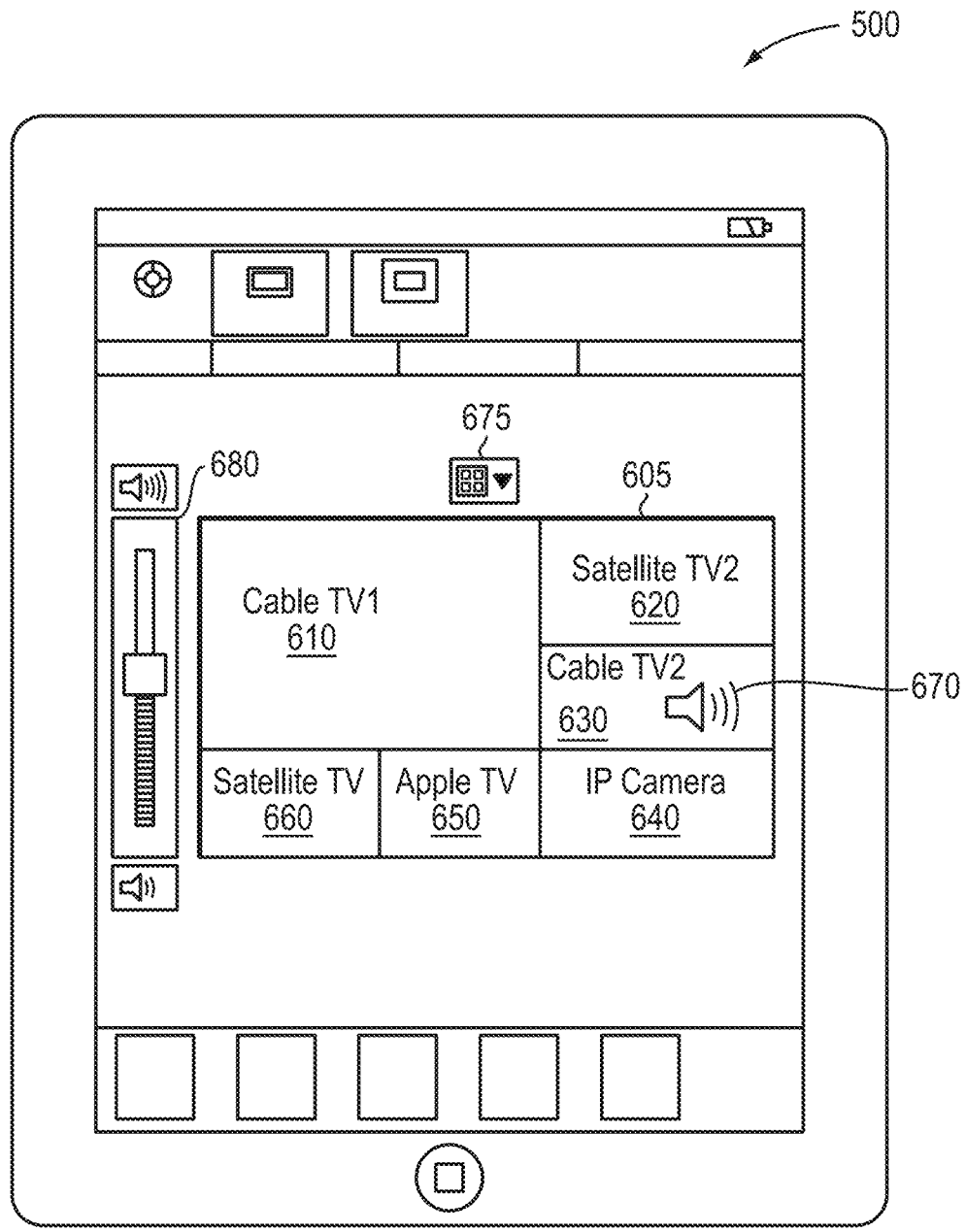
FIG. 6 is an exterior view of an example wireless mobile device, showing an example user interface (UI)

FIG. 6 is an exterior view of an example wireless mobile device 500 showing an example UI. The UI includes a plurality of UI tiles 610-660 arrange arranged on a virtual display screen 605. UI tiles 610-660 are each a graphical representation of a corresponding video tile 310-360, and are arranged in a tiling layout that corresponds to the arrangement of the video tiles 310-360 on the screen 305 of the display device 400. The virtual display screen 605 is a graphical representation of the screen space of the screen 305 of the display device 400. The UI tiles 610-660 may include static images, or in some implementations, may show the same video content being shown in the corresponding video tiles 310-360 on the display device 400.

A respective video source device that provides the content of each video tile 310-360 may be indicated within the respective UI tile 610-660, for example, via text labels. Further, a particular one of the video tiles 310-360 for which related audio is to be played on an audio output device may be indicated, for example, by an sound icon 670. Audio volume may be adjusted by a volume control 680. A layouts menu may be accessed by a layouts icon 675. Other functionality may be accessed by other icons and interface elements.

Using gestures on the touch sensitive screen 540 of the wireless mobile device 500, a user may resize and/or rearrange the UI tiles 610-660 on the virtual display screen 605. For example, a user may use gestures to expand a particular UI tile, so that it encompasses a greater portion, or all, of the virtual display screen 605, or contract a particular UI tile, so that it encompasses a smaller portion of the virtual display screen 605. Similarly, a user may use gestures to swap a particular UI tile with another UI tile, so their respective positions are exchanged. In response to resizing or rearranging UI tiles, the host controller 120 may cause the matrix switcher/controller 200, and its multi-window video processing output modules 285, to change the tiled video output stream, such that the video tiles shown on the display device 400 are resized and/or rearranged in a corresponding manner.

Figure 7:
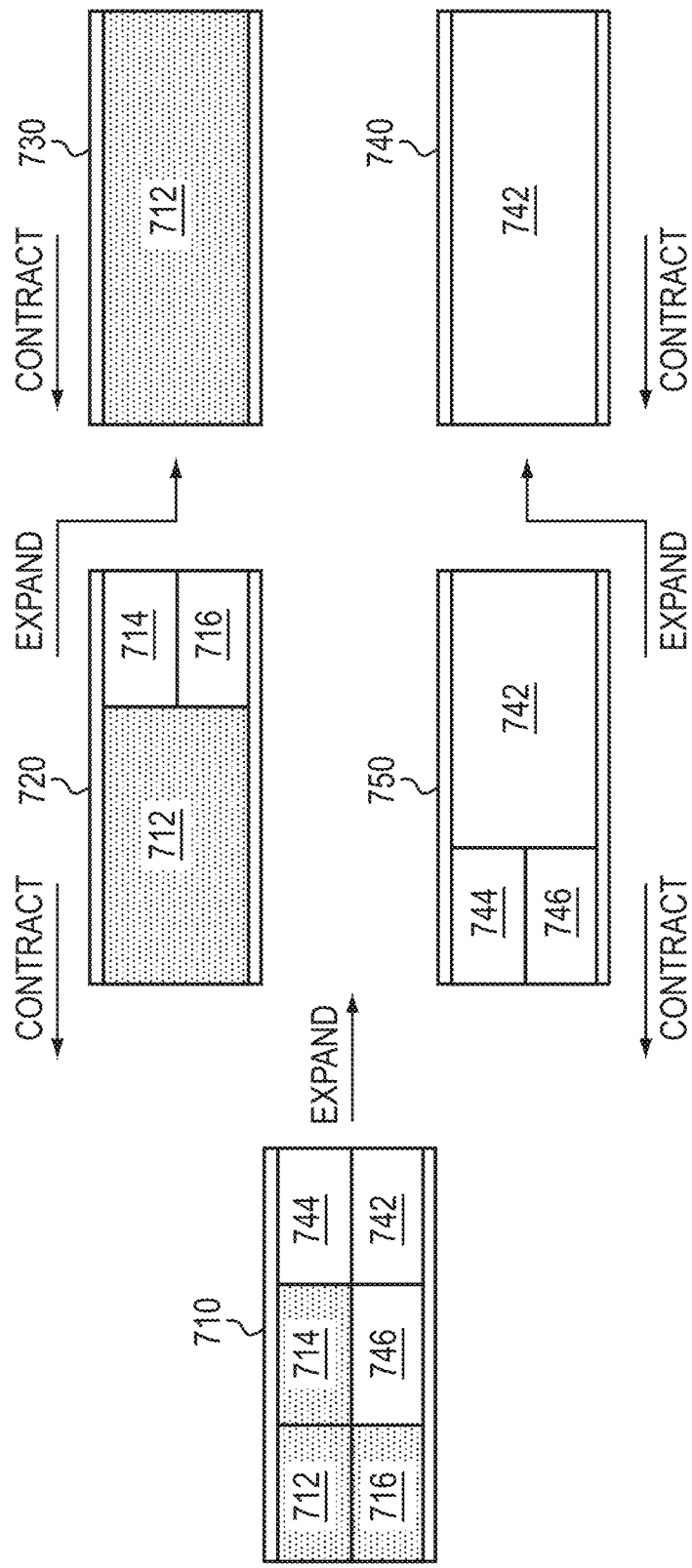
FIG. 7 is a diagram of an example expansion progression, and an example contraction progression.

Resizing may effectively transition between different preset tiling layouts, according to a defined expansion or contraction progression. FIG. 7 is a diagram of an example expansion progression and an example contraction progression. Beginning with a "2×3" tiling layout 710, there are a plurality of tiles 712-716, 740-746 (representing both video tiles and corresponding UI tiles). If a first tile 712 is expanded, it may be transitioned to be the primary tile of a "1 Left 2 Right" tiling layout, while nearby tiles 714, 716 become the secondary tiles, according to a defined progression. If the first tile 712 is expanded again, it may be transitioned to be the single tile of a "Fullscreen" tiling layout, according to the defined progression. Similarly, if a second tile 742 is being shown in a "Fullscreen" tiling layout and it is contracted, it may be transitioned to be the primary tile of a "1 Left 2 Right" tiling layout, while other tiles 744, 746 become the secondary tiles, according to a defined progression Likewise, if the second tile 744 is contracted again, is may be shown as part of the "2×3" tiling layout 710, along with additional tiles 712, 714, and 716. During resizing, associations between touch locations and the UI tiles may be constantly updated so that the UI correctly understands user input. Further, any occlusions created by foreground tiles upon background tiles may be dynamically accounted for.

Figure 8:
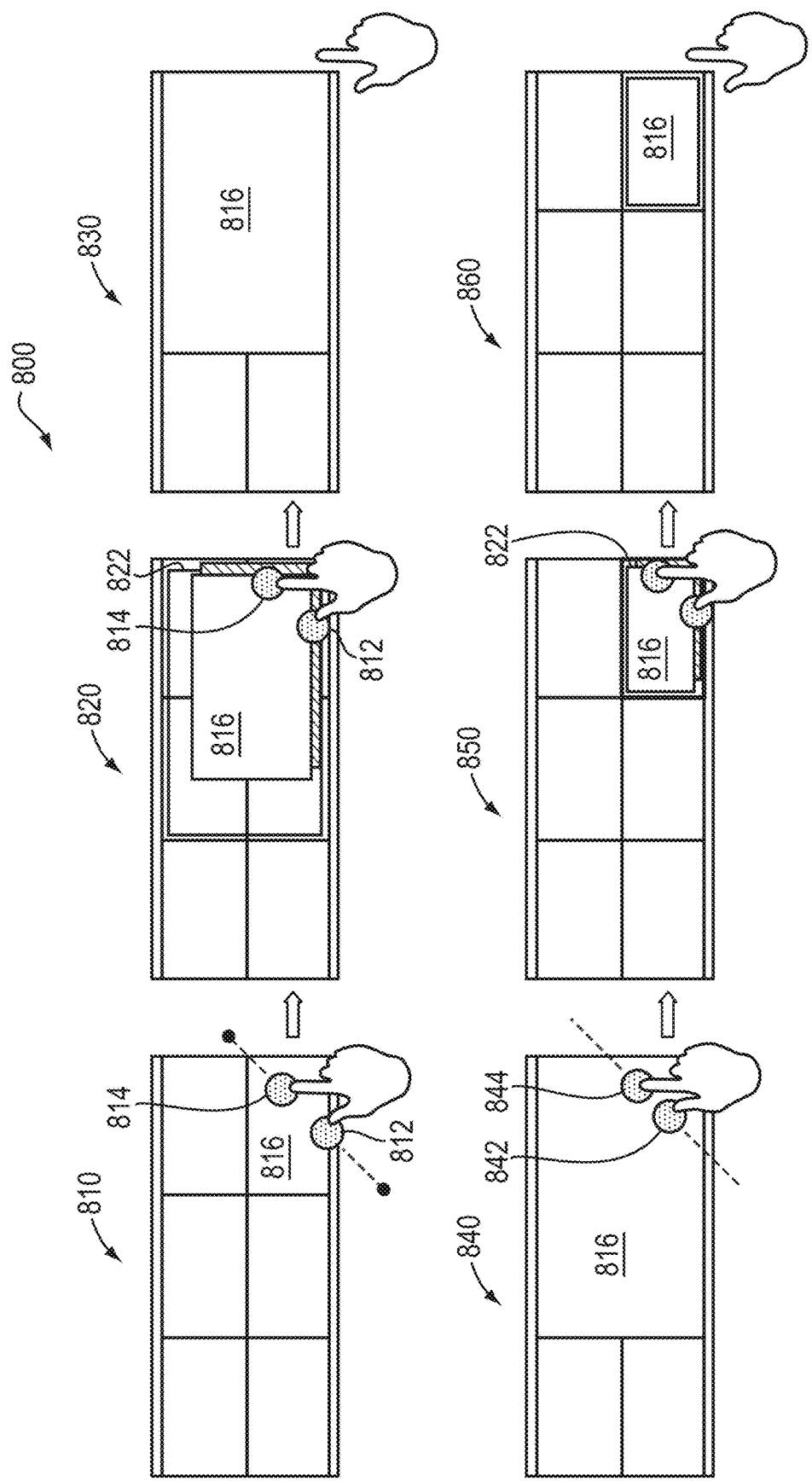
FIG. 8 is a diagram illustrating example expand and pinch multi-touch gestures to expand and contract UI tiles, and corresponding video tiles.

The gestures entered on the touch sensitive display screen 540 of the wireless mobile device 500 to resize the UI tiles 610-660 may include multi-touch gestures. FIG. 8 is a diagram 800 illustrating example expand and pinch multi-touch gestures, to expand and contract UI tiles, and corresponding video tiles. At frame 810, a user enters an expand gesture upon the touch sensitive screen 540 over a particular UI tile 816, by touching two points 812, 814 and moving apart. At frame 820, as the particular UI tile 816 expands, a visual indicator 822, for example, a red outline, may signal a "next size up" available for the tile according to an expansion progression. At frame 830, the user releases from touching the touch sensitive screen 540, and the particular UI tile 816 (and corresponding video tile) is set to an appropriate size according to the expansion progression.

At frame 840, a user enters a pinch gesture upon the touch sensitive screen 540 over the particular UI tile, by touching two points 842, 844 and moving together. At frame 850, as the particular UI tile 816 contracts, a visual indicator 822, for example, a red outline, may signal available area to place the particular UI tile 816 according to a contraction progression. At frame 860, the user releases from touching the touch sensitive screen 540, and the particular UI tile 816 (and corresponding video tile) is set to an appropriate size according to the contraction progression.

Figure 9:
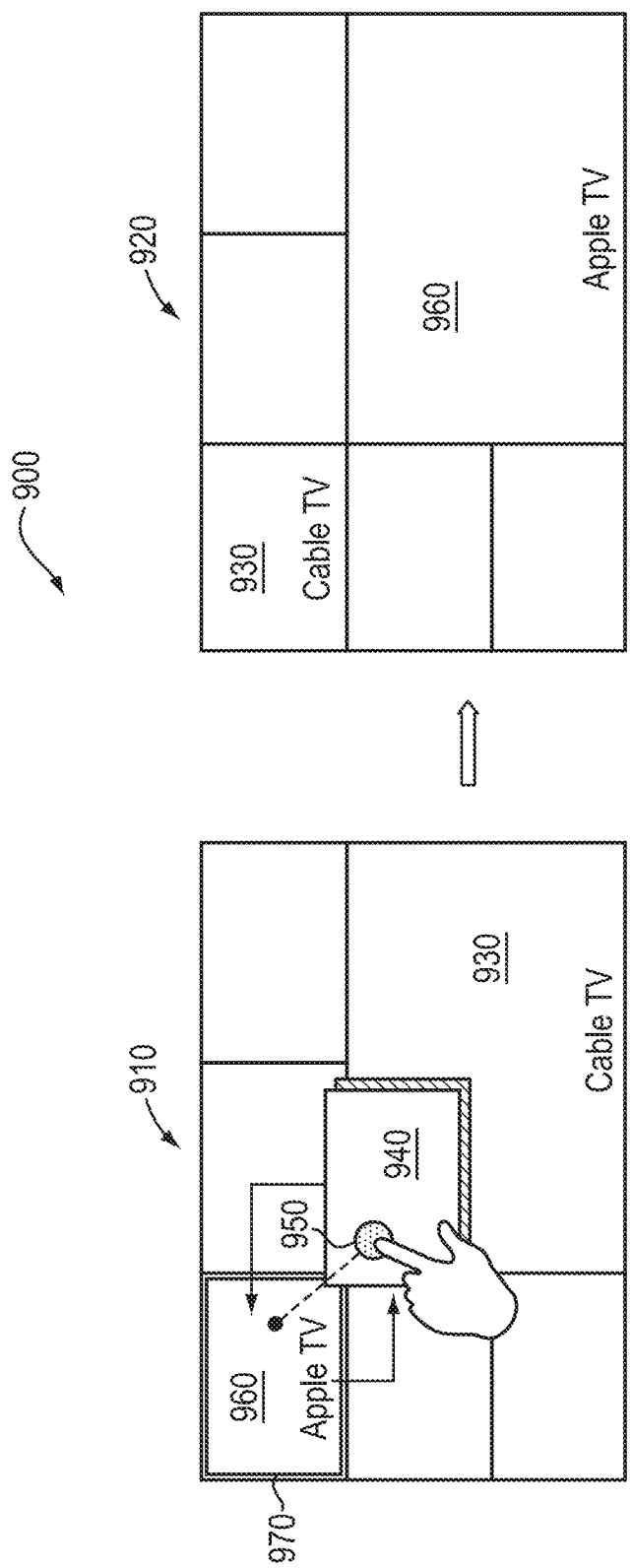
FIG. 9 is a diagram illustrating example drag and drop gestures to rearrange UI tiles, and corresponding video tiles.

Similar to resizing, rearranging may use gestures entered on the touch sensitive screen 540 of the wireless mobile device 500. FIG. 9 is a diagram 900 illustrating example drag and drop gestures to rearrange UI tiles, and corresponding video tiles. At frame 910, a user touches over a particular UI tile 930 on the touch sensitive screen 540, and begins to drag across the screen. The UI tile 930 may be decreased in size and shown as a representation 940 that moves with the location 950 of the user's touch. When the representation 940 is moved over another one of the UI tiles 960, a visual indicator 970, for example, a red outline, may indicate the particular UI tile can be swapped with that UI tile 960. At frame 920, when the user releases from touching the touch sensitive screen 540, the UI tiles 930, 960 (and corresponding video tiles) are swapped.

Further, in addition to rearranging and resizing, gestures entered on the touch sensitive screen 540 of the wireless mobile device 500 may be used to change the particular one of the video tiles 310-360 for which related audio is played on an audio output device. Using a drag and drop gesture, the user may select the sound icon 670 and drag it from one UI tile to another UI tile. In response, the host controller 120 may cause the matrix switcher/controller 200 and it audio switch 250 to direct audio for the corresponding video tile to an audio output device.

Figure 10:
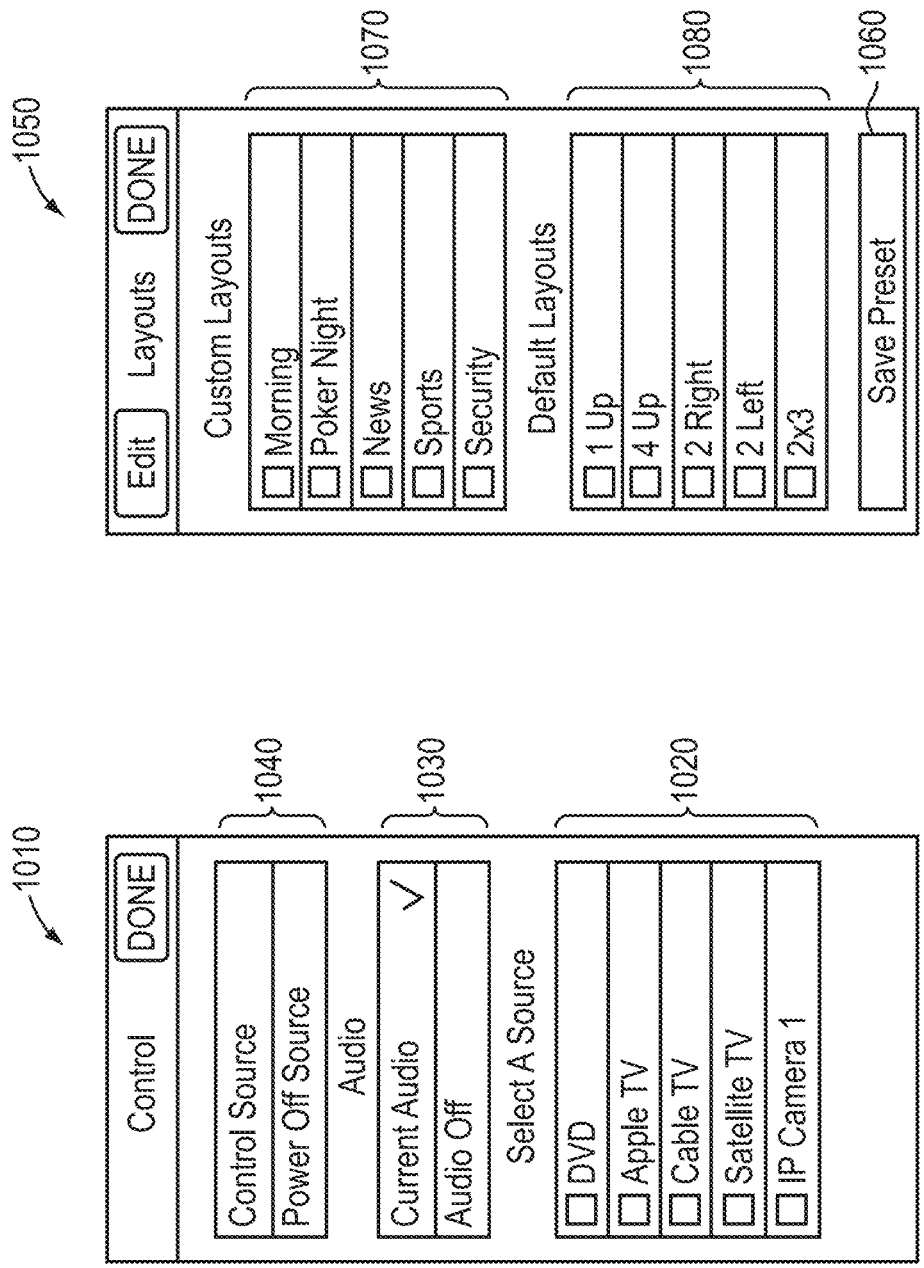
FIG. 10A depicts an example control options menu that may be shown in the UI.
FIG. 10B depicts an example tiling layouts menu that may be shown in the UI.

Still further, gestures in conjunction with menus may be used on the sensitive screen 540 of the wireless mobile device 500 to configure and change properties of video tiles, and video source devices. In response to a touch and hold over a particular UI tile on the touch sensitive screen 540 of the wireless mobile device 500, a control options menu may be shown in the UI. FIG. 10A depicts an example control options menu 1010 that may be shown in the UI. In region 1020, a user may select a particular video source device (e.g., a disc player 120, a cable television box 140, a satellite television receiver 150, a digital media receiver 160, a surveillance camera, a video conferencing system, a computer system, a gaming system, etc.) for the video tile corresponding to the particular UI tile. A particular video stream (e.g., a channel) offering particular video content from that video source device may be selected via additional controls (not shown). In region 1030, the user may select whether the corresponding video tile is the one whose related audio is to be played on an audio output device. Further, in region 1040, the video source device that provides the video stream may be controlled, or powered off.

A user may save a current tile arrangement and configuration as a custom tiling layout. FIG. 10B depicts an example layouts menu 1050 that may be shown in the UI. The layouts menu 1050 may be shown in response to selection of the layouts icon 675. By selecting an interface element (e.g., a button) 1060, the current video tiling layout may be saved as a custom tiling layout. Upon saving, the custom tiling layout may be displayed in a region 1070, for later rapid selection. Preset tiling layouts also may be displayed for selection, in another region 1080.

Figure 11:
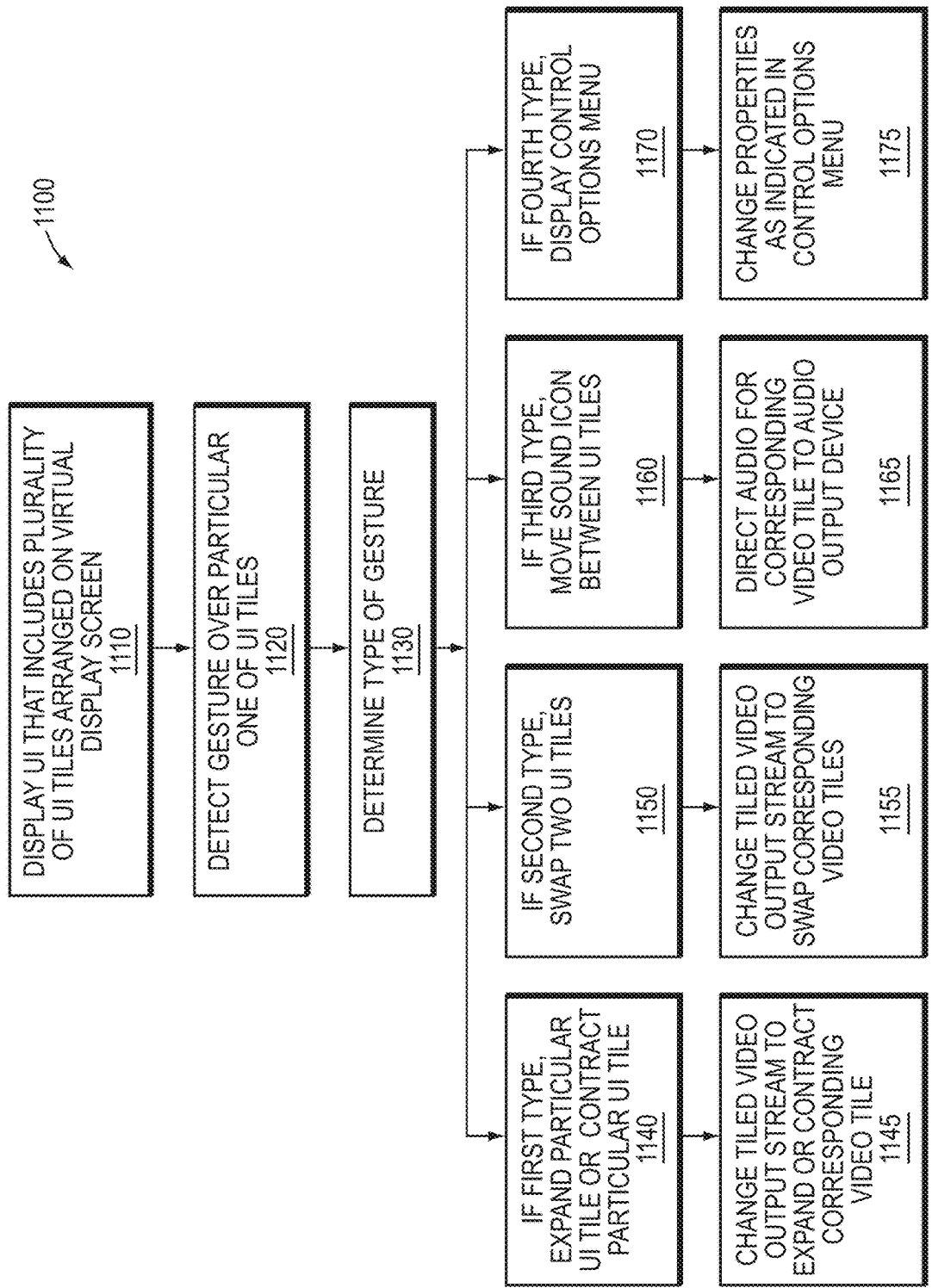
FIG. 11 is a flow diagram of an example sequence of steps for browsing video content of multiple video streams using gestures on a touch sensitive screen of a wireless mobile device.

FIG. 11 is a flow diagram of an example sequence of steps 1100 for browsing video content of multiple video streams using gestures on the touch sensitive screen 540 of a wireless mobile device 500. At step 1110, a control app 560 executing on the wireless mobile device 500, working in conjunction with the host controller 120, displays a UI that includes a plurality of UI tiles 610-660 arranged on virtual display screen 605, each UI tile being a graphic representation of a corresponding video tile shown on the display device 400. At step 1120, a gesture (e.g., a multi touch gesture) is detected on the touch sensitive screen 540 over a particular one of the UI tiles. At step 1130, a type of the gesture is determined.

If the gesture is of a first type (e.g., an expand or pinch multi-touch gesture), at step 1140, the control app 560 may expand the particular UI tile, so that it encompasses a greater portion or all of the virtual display screen 605, or contract the particular UI tile so that it encompasses a smaller portion of the virtual display screen 605. Further, at step 1145, the host controller 120 may cause the matrix switcher/controller 200 and its multi-window video processing output modules 285 to change the tiled video output stream, such that a corresponding video tile is expanded or contracted in a corresponding manner.

If the gesture is of a second type (e.g., a drag and drop gesture), at step 1150, the control app 560 may move a representation of the particular UI over another UI tile in response to the gesture, and upon release swap the two UI tiles. Further, at step 1155, the host controller 120 may cause the matrix switcher/controller 200 and it multi-window video processing output modules 285 to change the tiled video output stream, such that corresponding video tiles are swapped in a corresponding manner.

Further, if the gesture is of a third type (e.g., a drag and drop over a sound icon 670), at step 1160, the control app 560 may move the sound icon from the particular UI tile to another UI tile in response to the gesture. At step 1165, the host controller 120 may cause the matrix switcher/controller 200, and it audio switch 250, to direct audio for the corresponding video tile to an audio output device.

Further, if the gesture is of a fourth type (e.g., a touch and hold), at step 1170, the control app 560 may display a control options menu 1010 in the UI, which may be used to configure and change properties of the corresponding video tile, and the video source device that provides the video stream for that video tile. At step 1175, the host controller 120 may cause the matrix switcher/controller 200 to change properties as indicated in the control options menu 1010.

The video tiling system discussed above may provide for the display of an effectively unlimited number of video streams through a recursive tiling technique. Rather than show a single video stream from a particular video source device, one or more of the video tiles may be configured to show a tiled video output stream, such that multiple nested video tiles are shown within the confines of the video tile.

Figure 12:
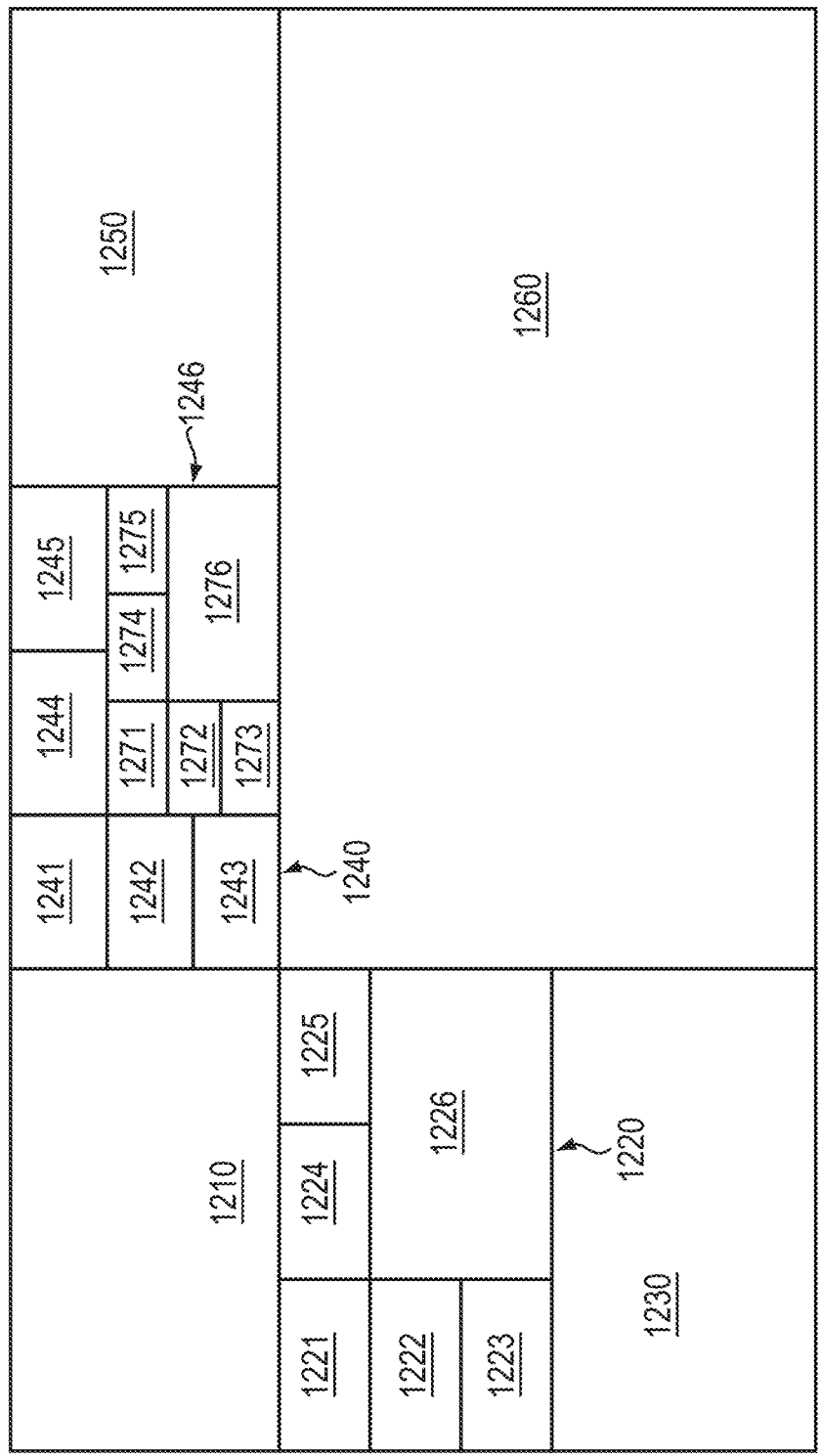
FIG. 12 is a diagram of an example tiled video display including nested video tiles created through an example recursive tiling technique.

FIG. 12 is a diagram of an example tiled video display including nested video tiles, created through a recursive tiling technique. In this example, the video tiling system uses six video tiles at each level. However, it should be understood that different numbers of video tiles may be used in different embodiments. Of the six primary video tiles 1210-1260, some of the tiles 1210, 1230, 1250, 1260 may show video content of a single video stream. Other tiles 1220, 1240 may include a plurality of nested video tiles. The nesting may continue for a user-selectable number of levels. For example, a first video tile 1220 may include one level of nesting, including within its confines six first level nested video tiles 1221-1226, each of which shows video content of a single respective video stream. Similarly, a second video tile 1240 may include two levels of nesting. The second video tile 1240 may include within its confines six first level nested video tiles 1241-1246, five of which 1241-1245 show video content of a single respective video stream. The sixth first level nested video tile 1246 may include within its confines six further nested video tiles 1271-1276, each of which shows video content of a single respective video stream. It should be understood that this pattern may be repeated, with additional levels of nesting, for a configurable number of levels. Further, it should be understood that some or all of the video tiles at any particular level of nesting may include nested video tiles.

Figure 13:
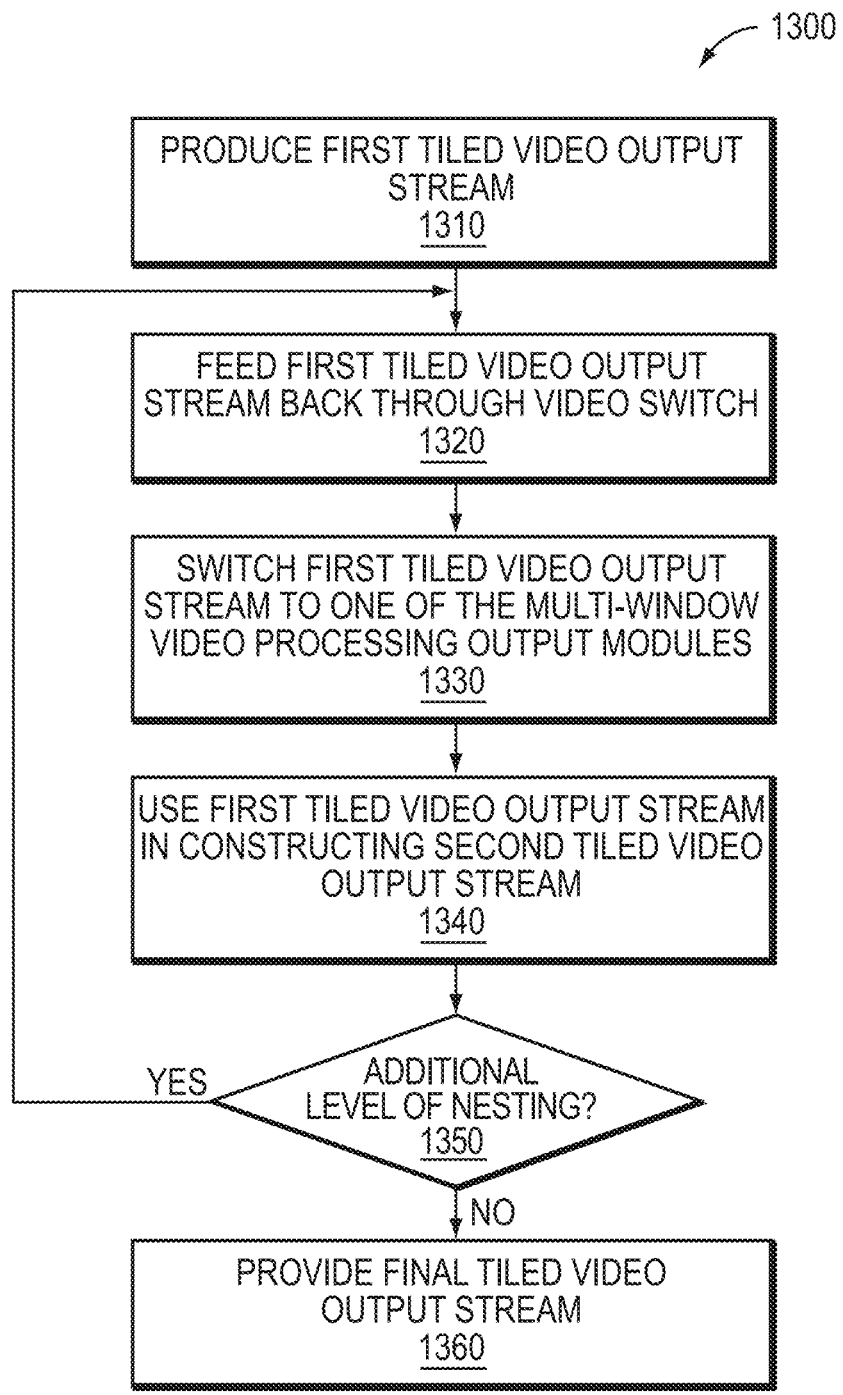
FIG. 13 is a flow diagram of a sequence of steps for creating a tiled video display including nested video tiles through a recursive tiling technique.

To provide for nested video tiles, tiled video output streams may be fed back through the video switch 260 to the multi-window video processing output modules 285, and used to construct further tiled video output streams. FIG. 13 is a flow diagram of an example sequence of steps 1300 for creating a tiled video display including nested video tiles, through a recursive tiling technique. At step 1310, a first tiled video output stream is produced by one of the multi-window video processing output modules 285, using the techniques discussed above. At step 1320, the multi-window video processing output module feeds the first tiled video output stream back through the video switch 260. At step 1330, the video switch 260 switches the first tiled video output stream to one of the multi-window video processing output modules 285. At step 1340, the first tiled video output stream is used in place of a video stream from a video source device by a receiving multi-window video processing output module, and a second tiled video output stream is eventually constructed. In the second tiled video output stream, the video tiles of the first tiled video output stream are shown as nested video tiles. At step 1350, a decision is made whether there is to be an additional level of nesting. If not, execution may proceed to step 1360, where the second tiled video output stream is provided as a final video output stream to be shown on a display device 400. If not, execution proceeds back to steps 1310-1340, where the second tiled video output stream is fed back again (now being used as the first tiled video output stream), and a new second video output stream is produced therefrom, having another level of nesting. The process may be repeated to eventually to produce the final video output stream that shows the desired number of video streams.

The user may use the UI shown on the touch sensitive screen 540 the wireless mobile device 500 to navigate through the layers of nesting. In addition to there being UI tiles that correspond to each video tile, there may be nested UI tiles that correspond to each nested video tile. Using gestures (e.g., multi-touch gestures) on the touch sensitive display 540 of the wireless mobile device 500, a user may expand a UI tile having nested UI tiles to encompasses some, or all, of the virtual display screen 605. This may cause a corresponding change of the video tiles on the screen of the display device 400. The user may then, using similar gestures, expand one of the nested UI tiles, again causing corresponding video tile changes, to proceed to a lower level. Alternatively, the user may contract nested UI tiles, and corresponding nested video tiles, to progress up to a higher level. In this manner, the user may navigate between the video content of a large number of video streams.

It should be understood that various adaptations and modifications may be made within the spirit and scope of the embodiments discussed herein. For example, while is discussed above that a tiled video display may be shown upon a single display device, in alternative embodiments the tiled video display may be shown on a plurality of display devices. In some implementations, the tiled video display may be shown in its entirety on each display device of the plurality. In other implementations, portions of the tiled video display may be shown on each display device of the plurality, which may be arranged side-by-side as a video wall. In such an implementation, a plurality of different video output streams may be generated, each corresponding to a respective display device, and distributed appropriately.

Further, it should be understood that at least some portions of the above-described techniques may be implemented in software, in hardware, or a combination thereof. A software implementation may include executable instructions stored in a non-transitory device-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both executable instructions stored in a non-transitory device-readable medium, as well as one or more hardware components, for example, processors, memories, etc. Accordingly, it should be understood that the above descriptions are meant to be taken only by way of example.

What is claimed is:

1. A method comprising:
   displaying a tiled video display on a screen of a display device, the tiled video display including a plurality of video tiles that each show video content of a different video stream of a plurality of video streams, the video tiles arranged on the screen according to a tiling layout;
   displaying a user interface (UI) on a touch sensitive screen of a wireless mobile device separate from the display device, the UI showing a virtual display screen including a plurality of gesture-responsive UI tiles that each correspond to a respective video tile of the tiled video display that is displayed on the screen of the display device, the gesture-responsive UI tiles arranged on the virtual display screen according to the tiling layout of the video tiles, the gesture-responsive UI tiles each including a static image corresponding to the video content being shown in the respective video tile of the tiled video display that is displayed on the screen of the display device;

detecting a gesture over at least a portion of a particular one of the gesture-responsive UI tiles on the touch sensitive screen; and in response to the gesture, modifying both the particular gesture-responsive UI tile on the virtual display screen and a corresponding video tile that is displayed on the screen of the separate display device, wherein the modifying at least one of resizes, swaps location, or moves both the particular gesture-responsive UI tile and the corresponding video tile.

2. The method of claim 1, wherein the modifying comprises:

resizing the particular gesture-responsive UI tile to encompass a greater portion of the virtual display screen or a smaller portion of the virtual display screen, and resizing the corresponding video tile to encompass a greater portion of the screen of the separate display device or to encompass a smaller portion of the screen of the separate display device, in a manner corresponding to the resizing the particular gesture-responsive UI tile.

3. The method of claim 2, wherein the gesture is an expand or a pinch multi-touch gesture.

4. The method of claim 2, wherein the resizing the particular gesture-responsive UI tile and the resizing the corresponding video tile transitions the tiling layout to a different tiling layout that includes a different number of tiles.

5. The method of claim 4, wherein the transition from the tiling layout to the different tiling layout is according to a predefined expansion or contraction progression that defines a series of transitions between tiling layouts.

6. The method of claim 1, wherein the modifying comprises:

swapping the particular gesture-responsive UI tile with another gesture-responsive UI tile at a different location on the virtual display screen; and swapping the corresponding video tile with a video tile at a different location on the screen of the separate display device, in a manner corresponding to the swapping the particular gesture-responsive UI tile.

7. The method of claim 6, wherein the gesture is a drag and drop gesture.

8. The method of claim 1, wherein the modifying comprises:

moving a sound icon from the particular gesture-responsive UI to another gesture-responsive UI tile on the virtual display screen; and directing audio associated with a video tile corresponding to the another gesture-responsive UI tile to an audio output device.

9. The method of claim 1, wherein at least one of the video tiles includes a plurality of nested video tiles, the nested video tiles each showing video content of a different respective video stream.

10. The method of claim 9, wherein the at least one of the nested video tiles itself includes a plurality of nested video tiles, the nested video tiles each showing video content of a different respective video stream.

11. The method of claim 1, least one of the video tiles includes a plurality of nested video tiles, and the method further comprises:

generating a first tiled video output stream that includes a first plurality of video tiles that each show video content of a different video stream provided from one or more video source devices;

generating a second tiled video output stream that includes a second plurality of video tiles, wherein at least one of the video tiles of the second tiled video output stream shows video content of a video stream from one or more video source devices, and at least one of the video tiles of the second tiled video output stream shows the first tiled video output stream, such that the first plurality of video tiles appear as nested video tiles within a single tile of the second plurality of video tiles; and using the second tiled video output stream as a basis for the tiled video display that is displayed on the display device.

12. An apparatus comprising:

a video switch configured to switch a plurality of video streams from one or more video source devices; and a least one video scalar, frame buffer, and mixer that operate together, the at least one video scalar, frame buffer, and mixer configured to:

receive the plurality of video streams from the video switch, based on the plurality of video streams, generate a tiled video output stream that includes a plurality of video tiles that each show video content of a different video of the plurality of video streams, the video tiles arranged in a tiling layout, and output the tiled video output stream to a display device coupled to the apparatus; and a processor configured to execute a management process that manages the construction of the tiled video output stream, the management process configured to, in response to user input received on a particular UI tile in a user interface (UI) displayed on a wireless mobile device separate from the apparatus and the display screen, modify the particular UI tile and a corresponding video tile of the tiled video output stream, wherein the modifying at least one of resizes, swaps location, or moves both the particular UI tile and the corresponding video tile, wherein the particular UI tile that receives the user input is one of a plurality of UI tiles displayed on a virtual display screen of the UI, the plurality of UI tiles are arranged on the virtual display screen according to the tiling layout of the video tiles, and the UI tiles each include a static image corresponding to the video content being shown in the respective video tile.

13. The apparatus of claim 12, wherein the modifying comprises a resize of the particular UI tile and the corresponding video tile.

14. The apparatus of claim 12, wherein the resize of the particular video tile comprises a transition from the tiling layout to a different tiling layout that includes a different number of tiles.

15. The apparatus of claim 12, wherein the modifying comprises a swap of the particular UI tile with another UI tile at a different location in the tiling layout and a swap of the corresponding video tile with another video tile at a different location in the tiling layout.

16. The apparatus of claim 12, wherein at least one of the video tiles includes a plurality of nested video tiles, the nested video tiles each showing video content of a different respective video stream.

17. A non-transitory electronic device readable medium storing executable instructions, the instructions when executed on one or more processors of one or more electronic devices operable to:
> display a tiled video display on a first screen, the tiled video display including a plurality of video tiles that each show video content of a different video stream of a plurality of video streams, the video tiles arranged on the first screen according to a tiling layout;
> display a user interface (UI) on a second screen, the second screen separate from the first screen, the UI showing a virtual display screen including a plurality of input-responsive UI tiles that each correspond to a respective video tile of the tiled video display on the first screen, the input-responsive UI tiles arranged on the virtual display screen according to the tiling layout of the video tiles, the input-responsive UI tiles each including a static image corresponding to the video content being shown in the respective video tile of the tiled video display that is displayed on the screen of the display device;
> detect an input related to a particular one of the UI tiles on the second screen; and
> in response to the input, modify both the particular input-responsive UI tile on the virtual display screen and a corresponding video tile on the first screen, wherein the modifying at least one of resizes, swaps location, or moves both the particular input-responsive UI tile and the corresponding video tile.

18. The non-transitory electronic device readable medium of claim 17, wherein the second screen is a touch sensitive screen, and the input is a gesture over the particular one of the input-responsive UI tiles on the second screen, and the input-responsive UI tiles are gesture-responsive UI tiles.

19. The non-transitory electronic device readable medium of claim 17, wherein the modification to both the particular input-responsive UI tile on the virtual display screen and the corresponding video tile on the first screen is to resize the particular input-responsive UI tile to encompass a greater portion of the virtual display screen or a smaller portion of the virtual display screen, and to resize the corresponding video tile to encompass a greater portion of the first screen or to encompass a smaller portion of the first screen, in a manner corresponding to the resize of the particular input-responsive UI tile.

20. The non-transitory electronic device readable medium of claim 19, wherein the resize of the particular input-responsive UI tile and the resize of the corresponding video tile transitions the tiling layout to a different tiling layout that includes a different number of tiles.

21. The non-transitory electronic device readable medium of claim 20, wherein the transition from the tiling layout to the different tiling layout is according to a predefined expansion or contraction progression that defines a series of transitions between tiling layouts.

22. The non-transitory electronic device readable medium of claim 17, wherein the modification to both the particular input-responsive UI tile on the virtual display screen and the corresponding video tile on the first screen is to swap the particular input-responsive UI tile with another input-responsive UI tile at a different location on the virtual display screen and to swap the corresponding video tile with a video tile at a different location on the first screen, in a manner corresponding to the swap of the particular input-responsive UI tile.

23. The non-transitory electronic device readable medium of claim 17, wherein at least one of the video tiles includes a plurality of nested video tiles, the nested video tiles each showing video content of a different respective video stream.

24. The non-transitory electronic device readable medium of claim 23, wherein the at least one of the nested video tiles itself includes a plurality of nested video tiles, the nested video tiles each showing video content of a different respective video stream.

25. The non-transitory electronic device readable medium of claim 17, wherein at least one of the video tiles includes a plurality of nested video tiles, and the instructions when executed are further operable to:
> generate a first tiled video output stream that includes a first plurality of video tiles that each show video content of a different video stream provided from one or more video source devices;
> generate a second tiled video output stream that includes a second plurality of video tiles, wherein at least one of the video tiles of the second tiled video output stream shows video content of a video stream from one or more video source devices, and at least one of the video tiles of the second tiled video output stream shows the first tiled video output stream, such that the first plurality of video tiles appear as nested video tiles within a single tile of the second plurality of video tiles; and
> use the second tiled video output stream as a basis for the tiled video display that is displayed on the first screen.

* * * * *